United States Patent
Claus et al.

(10) Patent No.: US 10,982,769 B2
(45) Date of Patent: Apr. 20, 2021

(54) FLAT GASKET AND INTERNAL COMBUSTION ENGINE

(71) Applicant: REINZ-DICHTUNGS-GMBH, Neu-Ulm (DE)

(72) Inventors: Oliver Claus, Laichingen (DE); Steffen Erthle, Dornstadt (DE); Jochen Salzmann, Neu-Ulm (DE)

(73) Assignee: Reinz-Dichtungs GmbH, Neu-Ulm (DE)

( * ) Notice: Subject to any disclaimer, the term of this patent is extended or adjusted under 35 U.S.C. 154(b) by 100 days.

(21) Appl. No.: 16/345,940

(22) PCT Filed: Oct. 30, 2017

(86) PCT No.: PCT/EP2017/077751
§ 371 (c)(1),
(2) Date: Apr. 29, 2019

(87) PCT Pub. No.: WO2018/078155
PCT Pub. Date: May 3, 2018

(65) Prior Publication Data
US 2019/0264811 A1     Aug. 29, 2019

(30) Foreign Application Priority Data
Oct. 31, 2016   (DE) .................. 20 2016 106 106.7

(51) Int. Cl.
*F16J 15/08* (2006.01)

(52) U.S. Cl.
CPC ........ *F16J 15/0825* (2013.01); *F16J 15/0818* (2013.01); *F16J 2015/085* (2013.01)

(58) Field of Classification Search
CPC . F16J 15/0818; F16J 15/0825; F16J 2015/085
See application file for complete search history.

(56) References Cited

U.S. PATENT DOCUMENTS

| | | | | |
|---|---|---|---|---|
| 5,639,101 A | * | 6/1997 | Tanaka | F16J 15/0825 277/593 |
| 6,431,554 B1 | * | 8/2002 | Miyamoto | F16J 15/0825 277/593 |
| 6,918,597 B2 | * | 7/2005 | Egloff | B23K 11/115 277/594 |
| 8,342,537 B2 | * | 1/2013 | Imai | F16J 15/0825 277/594 |
| 8,382,123 B2 | * | 2/2013 | Schmitt | F16J 15/0825 277/594 |
| 8,444,154 B2 | * | 5/2013 | Schmitt | F16J 15/0818 277/594 |

(Continued)

FOREIGN PATENT DOCUMENTS

| | | |
|---|---|---|
| DE | 102013103146 | 10/2014 |
| JP | 2009156395 | 7/2009 |
| JP | 2011226641 | 11/2011 |

OTHER PUBLICATIONS

European Patent Office, International Search Report with Written Opinion issued in PCT/EP2017/077751, dated Feb. 2, 2018, 13 pages, European Patent Office, Rijswijk, Netherlands.

*Primary Examiner* — Nicholas L Foster
(74) *Attorney, Agent, or Firm* — Marshall & Melhorn, LLC

(57) ABSTRACT

A flat gasket for an internal combustion engine is described. The gasket may be used in the hot gas region of the internal combustion engine.

13 Claims, 6 Drawing Sheets

(56) References Cited

U.S. PATENT DOCUMENTS

| | | | |
|---|---|---|---|
| 9,127,621 B2 * | 9/2015 | Hu | F16J 15/0818 |
| 2003/0127805 A1 * | 7/2003 | Stapel | F16J 15/0825 |
| | | | 277/595 |
| 2007/0090608 A1 * | 4/2007 | Ueta | F16J 15/0818 |
| | | | 277/593 |
| 2009/0267308 A1 * | 10/2009 | Schmucker | F16J 15/0825 |
| | | | 277/592 |
| 2010/0038865 A1 * | 2/2010 | Schmitt | F16J 15/0825 |
| | | | 277/592 |
| 2010/0225068 A1 * | 9/2010 | Imai | F16J 15/0825 |
| | | | 277/591 |
| 2012/0228835 A1 * | 9/2012 | Schmitt | F16J 15/0825 |
| | | | 277/593 |
| 2014/0265156 A1 | 9/2014 | Okano | |
| 2015/0069719 A1 * | 3/2015 | Hu | F16J 15/0818 |
| | | | 277/593 |

* cited by examiner

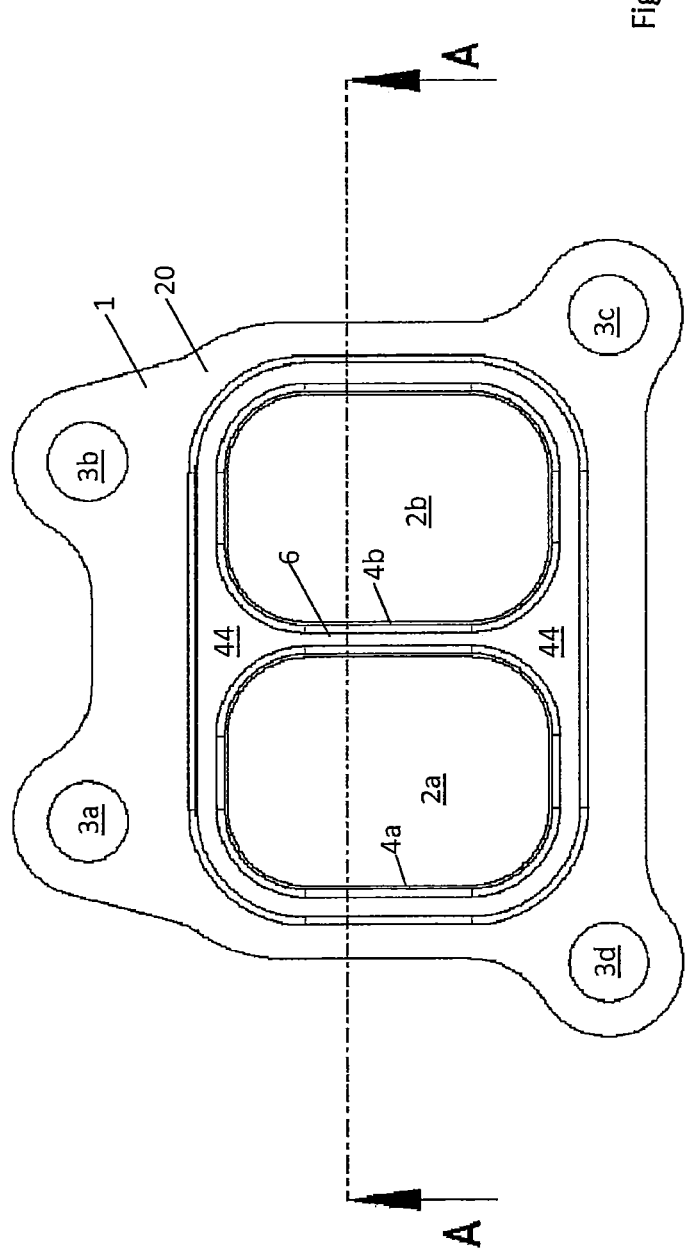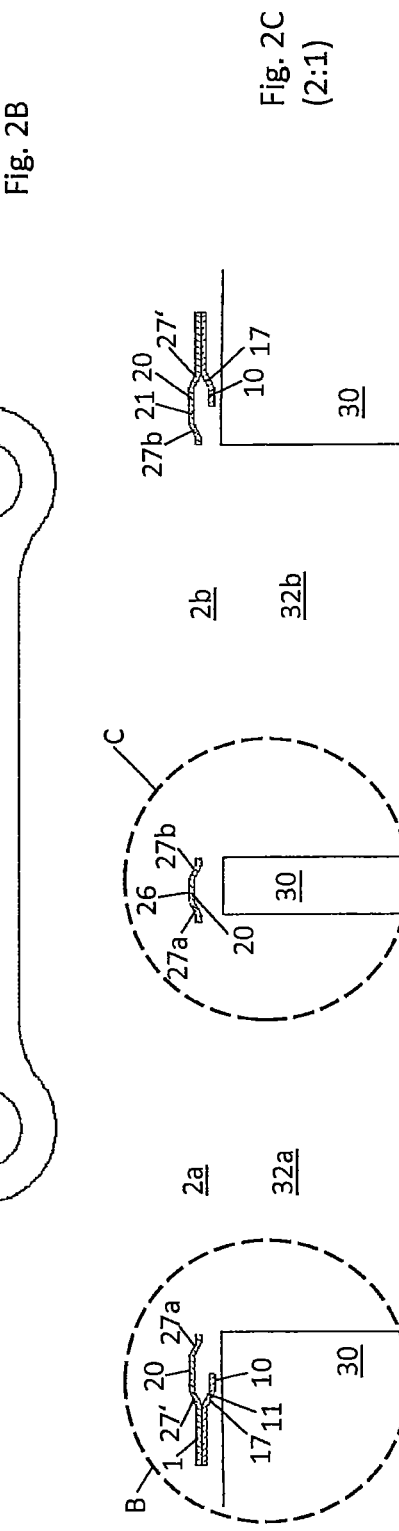

FLAT GASKET AND INTERNAL COMBUSTION ENGINE

The present invention relates to a flat gasket and to an internal combustion engine. In particular, such flat gaskets are used in the hot gas region of an internal combustion engine.

Particularly in the aforementioned regions, the flat gaskets used are usually multilayer flat gaskets, wherein one or more of the layers are metal layers. As sealing elements which are arranged to run around through-openings in the gasket, use is typically made of embossed elements, such as sealing beads for example. To ensure that the sealing effect of the sealing beads used is continuously maintained in the compressed, installed state of the gasket, use is made of additional compression protection elements or stopper elements, which for their part may be configured for example as a welded-on ring stopper, as an embossed stopper or as additional stopper layers, for example in the form of an additional stopper shaped like a pair of spectacles.

With such sealing geometries which contain both the sealing element and also the associated stopper or compression-limiting element, through-openings can be circumferentially sealed. This is possible even if multiple through-openings closely adjacent to one another are to be sealed individually, with webs being formed between the adjacent through-openings.

One problem with such conventional sealing geometries is that both the compression limiter and the sealing beads of a layer may settle and may even dig into adjacent layers in the compressed state.

The problem addressed by the present invention is therefore that of providing a flat gasket and an internal combustion engine which are easy and inexpensive to manufacture, ensure a reliable seal even in the hot gas region of an internal combustion engine, and, if used as a gasket with multiple adjacently arranged through-openings, at the same time create space for possible web growth. This problem is solved by the flat gasket and the internal combustion engine according to the claims. Advantageous developments of the flat gasket according to the invention are given in the respective dependent claims.

The flat gasket according to the invention may have one or more through-openings, for example through-openings for hot exhaust gases, which extend through the flat gasket and are to be sealed along their circumferential edge.

The flat gasket according to the invention has at least a first and a second metal layer, which are arranged adjacent to one another. The through-openings of the flat gasket extend through all the layers of the flat gasket according to the invention.

The first layer has, running around the circumference of the one or more through-openings, a layer edge which is configured as a half-bead pointing away from the second adjacent layer. In other words, the half-bead in the first layer is configured in such a way that it forms, running towards the through-opening, an angled portion which extends out of the layer plane of the first layer and away from the adjacent second layer, said angled portion being adjoined by a straight portion which runs substantially parallel to the layer plane of the first layer and ends at the rim of the layer edge, that is to say the inner circumferential edge of the first layer. The circumferential edge is therefore the inner circumferential edge, that is to say the inner rim.

The layer edge of the second layer, that is to say the inner edge region thereof, is configured as a full bead. In the context of this invention, a full bead is to be understood as a succession of two half-beads, wherein the two half-beads may have different heights, widths and/or slopes. The bead top of said full bead is directed away from the first layer. In other words, the two beads of the first and the second layer are directed away from one another.

According to the invention, the second layer now extends at least in some regions beyond the first layer in a region in which the first layer and the second layer encircle one, some or all of the through-openings, wherein the flank of the half-bead of the full bead of the second layer that is directly adjacent to the through-opening protrudes beyond the adjacently running circumferential edge of the first metal layer running around the through-opening(s).

Therefore, the first layer has a half-bead and the second layer has a full bead, wherein said full bead need not be symmetrical. The layer edge of the second layer covers the circumferential edge of the first layer. The circumferential edge of the second layer is therefore the portion of the flat gasket that extends furthest into the at least one through-opening.

Such a configuration of the sealing structure that encircles one through-opening or multiple through-openings has the advantage that the half-bead of the second layer that is directly adjacent to the circumferential edge can extend with its bead foot into the layer plane of the first layer when the flat gasket according to the invention is installed and compressed. Due to the absence of a second bead foot in the first layer and due to the fact that the circumferential edge of the first layer is set back from the circumferential edge of the second layer, a deformation limiter can be formed for the half-bead in the second layer that is directly adjacent to the circumferential edge. This half-bead of the second layer that is directly adjacent to the circumferential edge acts to protect against media the two other half-beads, that is to say one half-bead in the first layer and one half-bead in the second layer.

The sealing construction according to the invention in the flat gasket according to the invention thus makes it possible to omit an additional stopper for the half-bead in the first layer, such as for example a folded-over layer portion, a stopper ring, a stopper layer, or a stopper shaped like a pair of spectacles. In addition, the outer region of the sealing construction, which is characterized by the half-bead in the second layer that is directly adjacent to the circumferential edge and by the set-back circumferential edge of the first layer, protects the inner region of the sealing construction in the second layer. The half-bead running directly adjacent to the circumferential edge thus protects the half-beads that are at a distance from the circumferential edge. The half-bead and the set-back circumferential edge of the first layer serve as a deformation limiter for the half-bead of the second layer that is directly adjacent to the circumferential edge. The flat gasket according to the invention is therefore easier and cheaper to manufacture.

One particularly advantageous embodiment is obtained when, in projection of the flat gasket perpendicular to the plane of extension of the flat gasket, the circumferential edge of the first metal layer that encircles the through-opening is arranged in the bead top of the full bead of the second metal layer. This makes it possible for the bead foot of the second layer that runs around the through-opening to move into the layer plane of the first layer in the compressed state of the flat gasket, so that the first layer forms a deformation limiter for the half-bead in the second layer that is directly adjacent to the through-opening.

The flat gasket may advantageously be configured such that, in the non-compressed state, the bead foot that runs directly adjacent to the through-opening, that is to say the bead foot of the full bead of the second layer that points towards the through-opening, is arranged in the plane of the first layer as seen in cross-section through the flat gasket, or behind the plane of the first layer as seen from the second layer. By virtue of this pre-deformation, the full bead is pre-tensioned in the compressed state of the flat gasket.

Advantageously, in the non-compressed state, the portion of the second layer that runs between the bead foot and the circumferential edge preferably runs in a plane which extends substantially parallel to the plane of the second layer. However, it is particularly advantageous if, in the non-compressed state, the full bead of the second layer is symmetrical with regard to the bead feet thereof, and the latter are arranged in the same plane.

The flat gasket according to the invention is particularly suitable for sealing in the case of components which have at least two adjacent through-openings, for example in the case of multi-flow openings of exhaust manifolds or compressors. In this case, the flat gasket also has at least two through-openings which are arranged adjacent to one another in the layer plane and which are separated from one another by a web region.

In this case, the first layer does not extend into the web region but rather runs around the at least two through-openings outside of said through-opening and outside of the webs running therebetween. The half-bead in the first layer that is arranged along the circumferential edge of the through-openings therefore runs around an entirety of multiple through-openings which are arranged adjacent to one another, in particular around the entirety of the through-openings.

In contrast, the second layer extends into the web region. In particular, the half-beads of the full bead that are adjacent to the circumferential edge around the respective through-openings run through the web region, so that in each case a continuous half-bead runs around each through-opening or at least around individual ones of the plurality of through-openings.

The half-bead of the full bead of the second layer that in contrast runs at a distance from the circumferential edge around the through-opening(s) advantageously does not extend into the web region but rather runs around an entirety of multiple or all through-openings in a similar manner, in particular parallel to the half-bead in the first layer. With such an arrangement of the half-beads in the second layer, the half-beads of the second layer that are respectively arranged directly adjacent to the circumferential edges of adjacent through-openings together form a full bead in the web region.

What is essential in the present invention is that the overhang of the layer edge of the second layer beyond the layer edge of the first layer, in so far as it is provided to run around individual or multiple through-openings, does not occur by chance but rather is formed as a result of a defined arrangement of the circumferential edges and width of the layer edges of the first and the second layer, as described above. In particular, the overhang may be at least two times, preferably at least three times the sheet thickness of the second layer, measured in the overhang of the second layer. The measurement point used in this case is, for example, the bead foot of the full bead of the second layer that is adjacent to the circumferential edge, or optionally another region of the second layer that extends parallel to the layer plane of the second layer and is not angled.

The first and the second metal layer advantageously have sheet thicknesses which are largely equal, in particular differ from one another by ≤0.1 mm, advantageously by ≤0.05 mm, in the non-embossed and/or non-beaded region of the respective layer. In other words, the sheet thicknesses of the first and the second layer should advantageously be equal, leaving aside material and manufacturing tolerances. Typical sheet thicknesses for the first and second layer are sheet thickness pairs of 0.15 mm/0.15 mm, 0.15 mm/0.2 mm, 0.2 mm/0.2 mm, 0.2 mm/0.25 mm or 0.25 mm/0.25 mm for a respective pair consisting of first layer and second layer. In this case, it is possible for the first-mentioned value to belong to the first layer and the second-mentioned value to belong to the second layer, or vice versa.

In order to enhance the compression-limiting effect of the half-bead of the first layer, the first layer may have embossments at least in some portions, in particular along the layer edge of the through-opening. Said embossments may be configured for example as a corrugation, nub, check pattern or the like. With particular advantage, such embossments are arranged in the regions of the layer edge of the first layer which, in projection onto the plane of the flat gasket, come to lie in the bead top of the full bead of the second layer.

By virtue of such an additional embossing, the half-bead of the first layer and also the two half-beads of the second layer can be additionally limited in their deformation.

The formation of such embossed deformation limiters can take place at the same time as the embossing of the beads. Therefore, in order to form at least one deformation limiter that enhances the deformation-limiting effect of the first layer, it is not necessary to provide further separate elements or to fold the layer(s) back on themselves, which would require additional material and/or additional processes.

The present invention is not limited to a flat gasket having two layers. Instead, it is also possible to add further layers to the first layer and the second layer. With particular advantage, an even number of layers is used in the flat gasket according to the invention. In this case, advantageously in each case two directly adjacent layers can be formed around the through-openings in the flat gasket in the same way as the first and the second layer according to the description above. If, for example, the flat gasket has four layers, then in each case two outer layers arranged at a distance from one another and two inner layers arranged adjacent to one another can be formed along the layer edge or circumferential edge around the through-openings in a manner corresponding to one another, wherein advantageously both pairs of layers in this region are mirror-symmetrical with regard to the centre plane between said two pairs of layers. Here, mirror symmetry is to apply initially only to the direction of the beads and the length of the layers with respect to the circumferential edge. The height, width and/or slope of the respective beads may well be somewhat different, but may also be the same. It is possible, but not preferred, that the flat gasket has further layers, in particular exactly one smooth sheet layer, which serves to adapt the thickness of the gasket to the installation situation. For example, in the case of a 4-layer structure which is otherwise symmetrical and which has two first and two second layers, such a layer may be accommodated in the middle between the other layers.

While the circumferential edges, that is to say the inner edges, of the layers are deliberately designed to be different, that is to say do not coincide in a projection into the layer plane of one of the layers, it is advantageous if the outer edges of the layers of the flat gasket are substantially identical, that is to say do coincide in a projection into the layer plane of one of the layers, or at least are at a distance from one another that is smaller than the width of a bead limb, in particular the narrowest of the bead limbs of the flat gasket. Through-openings for fastening means usually extend through all the layers of the flat gasket in a corresponding manner.

The flat gaskets according to the invention can be used in particular as gaskets in the hot gas region of an internal combustion engine, such as for example in the exhaust gas region or in the region of a compressor. In the exhaust gas region of an internal combustion engine, the gaskets according to the invention are suitable in the region of exhaust gas purification, in particular in the region of a catalytic converter. However, they can also be used on compressors, in particular turbochargers or superchargers. It is also possible to use the flat gaskets according to the invention in gas-fired power plants or stationary hot gas lines.

A few examples of flat gaskets according to the invention will be given below. In the individual examples, identical or similar reference signs denote identical or similar elements, and therefore the explanation thereof will in some instances not be repeated. Features which are not essential to the invention are also described in the following examples. Said features are further optional and advantageous features in addition to the features provided according to claim 1. They can be used according to the invention either alone or in combination with other such features in the respective example or also in combination with other such features in other examples.

DETAILED DESCRIPTION

Figure 1:
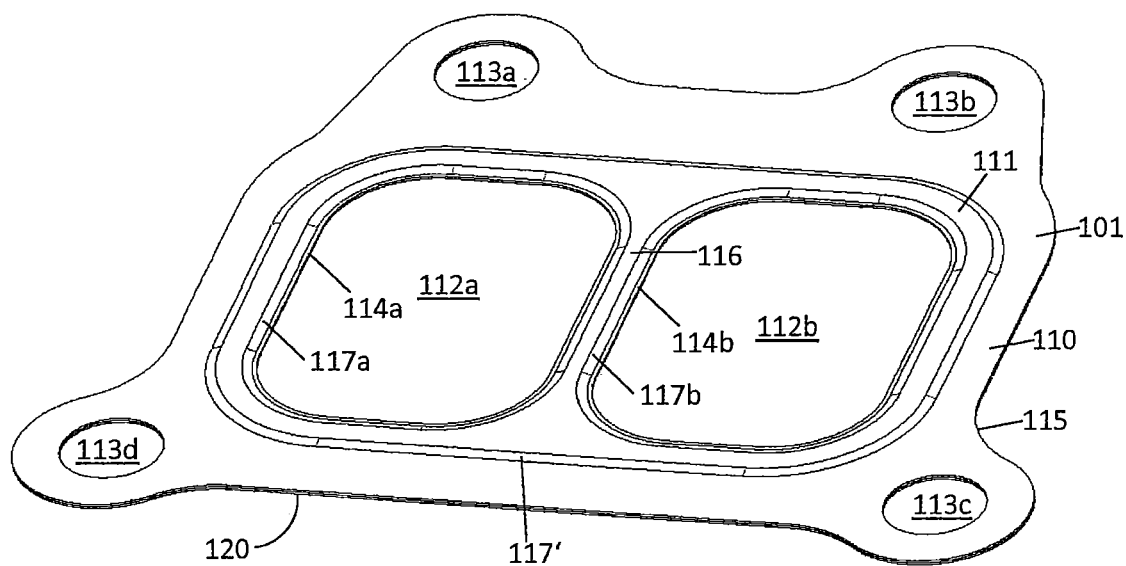
FIG. 1 shows a gasket for a turbocharger according to the prior art.

FIG. 1 shows a conventional flat gasket 101 for a turbocharger in a view looking towards a first layer 110 of the flat gasket 101. The first layer 110 has two through-openings 112a and 112b, around which there runs a respective layer edge 114a, 114b. A web 116 of the layer 110 is formed between the two through-openings 112a and 112b. The layer 110 additionally has screw holes 113a to 113d, which are arranged within the outer edge 115 of the layer 110 and outside of the region of the layer 110 that directly encircles the through-openings 112a and 112b. The first layer 110 has a bead 111 which runs around the through-openings 112a and 112b and along the layer edges 114a, 114b, said bead being configured as a full bead. The half-beads 117a, 117b of the full bead 111 that run around the through-openings 112a and 112b extend into the web region 116, while the outer half-bead 117' of the full bead 111 runs around both through-openings 112a and 112b.

The second layer 120 of the same flat gasket 101 is mirror-symmetrical to the illustrated first layer 110, but in the present diagram is largely hidden by the first layer 110.

Figure 2A:
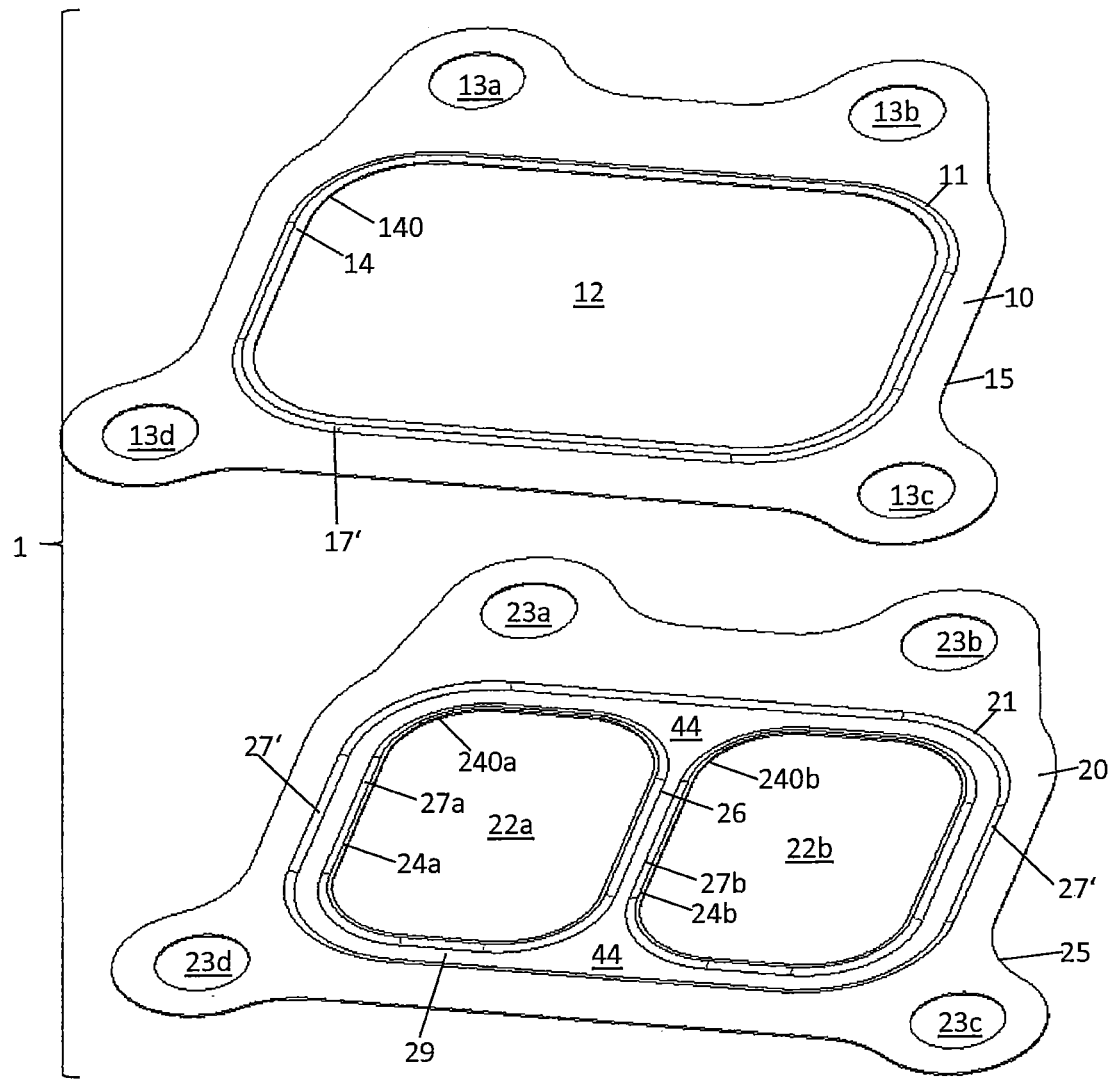
FIG. 2 shows, in three sub-FIGS. 2A-2C, a gasket for a turbocharger according to the present invention.

FIG. 2 shows, in three sub-FIGS. 2A to 2C, a flat gasket 1 according to the present invention. While the second layer 20 shown at the bottom in FIG. 2A is configured in the same way as the second layer 20 of the exemplary embodiment of FIG. 1, that is to say as a mirror image of the first layer 10 visible therein, the first layer 10 no longer has a web. As a result, the first layer 10 has just one through-opening 12 which encircles the two through-openings 22a and 22b of the layer 20 and covers the circumferential edges thereof. FIG. 2B shows a plan view of a flat gasket as shown as individual layers in a perspective view in FIG. 2A. FIG. 2C shows an enlarged cross-section through said flat gasket along the line A-A in FIG. 2B.

Overall, therefore, two through-openings corresponding to the through-openings 22a and 22b extend through the flat gasket 1 consisting of the two layers 10 and 20.

In contrast to conventional flat gaskets, the layer edge 14 or the circumferential edge 140 of the layer 10 now runs around the entire through-opening 12 and thus also the corresponding through-openings 22a and 22b in the first layer. The region adjacent to the circumferential edge 140, that is to say the layer edge 14, has a bead 11 which is configured as a half-bead 17.

The circumferential edge 140 of the first layer 10, in projection onto the layer plane of the layer 20, now runs at a greater distance from the through-openings 22a and 22b of the layer 20 than the circumferential edges 240a and 240b of the second layer 20. The layer edge 24a and the layer edge 24b thus protrude beyond the circumferential edge 140 and beyond the layer edge 14 in the direction of the through-openings 22a and 22b in those regions in which the circumferential edge 140 runs parallel to the circumferential edges 240a or 240b. The circumferential edges 240 of the second layer 20 thus form the elements of the flat gasket 1 that protrude furthest into the through-openings 22a, 22b.

The full bead 21 of the second layer 20 has a total of three half-beads 27a, 27b, 27', wherein the half-beads 27a and 27b each run completely around the through-opening 22a and 22b, respectively. The half-bead 27' runs around both through-openings 22a and 22b, without extending into the web region 26. In contrast, the two half-beads 27a and 27b break away from the half-bead 27' in the transition region 44 and extend into the web region 26. In the web region, the two half-beads 27a and 27b form a full bead, whereas outside of said web region they act to protect against media the two half-beads 17 of the first layer 10 and 27' of the second layer 20.

The layer 10 as the first layer shown at the top in FIG. 2A does not extend into the web region 26 but rather runs with its half-bead 17 around the entirety of the two through-openings 2a and 2b of FIG. 2B, which are separated by the web region 26 of the second layer 20, the assembled layers being shown as a finished gasket in said figure. The second layer 20 has a full bead 21, the half-bead 27' of which, arranged at a distance from the through-openings 2a and 2b, runs around the entirety of the through-openings 2a and 2b of the gasket 1, while the half-beads 27a and 27b directly adjacent to the through-openings 2a and 2b each run completely and in a closed manner around one of the through-openings 22a, 22b of the layer 20 or 2a, 2b of the gasket and thus extend into the web region 26. Together they form a full bead there.

FIG. 2A also shows that the outer edges 15, 25 of the first and second layer 10, 20 run in a substantially identical manner, that is to say substantially or completely coincide in projection into the plane of the second layer 20. It can also be seen from FIG. 2A that the through-openings 13a to 13d for fastening means extend through the first and the second layer 10, 20.

FIG. 2C, which shows the cross-section along line A-A from FIG. 2B enlarged to double the size, additionally shows the component 30 which is adjacent to the gasket 1 and which likewise has through-openings 32a, 32b, the latter in turn transitioning into the through-openings 2a and 2b. The detail shown on the extreme right is a mirror image of the detail B on the extreme left. In the region shown in detail B, the adjacent component 30 adjoins the gas through-opening 32a on just one side. During operation, therefore, only a limited expansion compared to the illustrated cold state of the internal combustion engine is to be expected as a result of the increase in temperature, since the heat in this region can be dissipated. Despite the slightly exploded representation, it is clear from detail B that the first layer 10 bears directly against the component 30. In contrast, detail C illustrates that the second layer 20, which runs in the web region without an adjacent first layer 10, is at a considerable distance from the web of the component 30 in the cold state shown. During operation, the component web is exposed both to the hot gas of the through-opening 32a and also to that of the through-opening 32b; in addition, there are hardly any possibilities for heat dissipation. During operation, therefore, the component web expands significantly compared to the cold state shown, in any event to a much greater extent than the region shown in detail B. The distance shown here between the component web and the web 26 formed in the second gasket layer 20 creates a compensation space for this purpose and makes it possible that the web region 26 of the gasket 1 is not excessively compressed during operation and still has sufficient springback. The flat gasket 1 therefore does not settle and also cannot dig into the web 26.

Figure 3A:
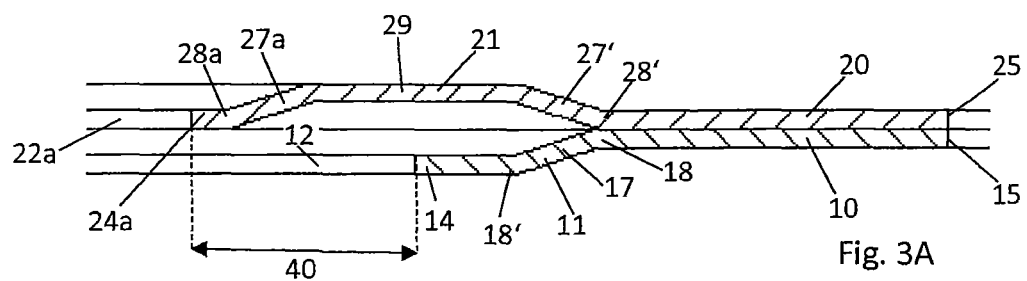
FIG. 3 shows enlarged cross-sections in the detail from the gasket in FIG. 2B.
Figure 3B:
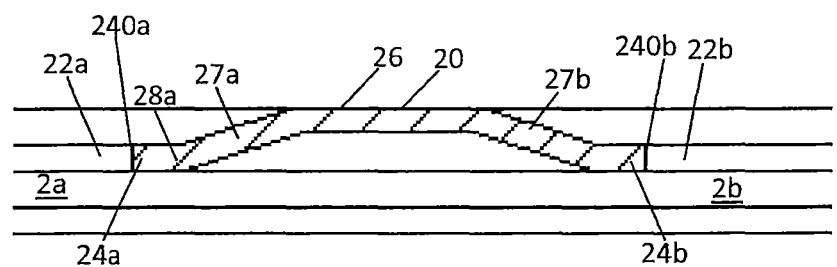

Sub-FIGS. 3A and FIG. 3B of FIG. 3 show two details from FIG. 2B. FIG. 3A shows an outer region of the gasket, as a mirror image of what is shown as detail B in FIG. 2B. The diagram in FIG. 3 does not include the lower component 30. The gasket in FIG. 3 is shown in the non-compressed state.

In this cross-section, the half-bead 27a is arranged symmetrically to the half-bead 27', so that the bead feet 28a, 28' on both sides of the full bead 21 are arranged in the layer plane of the second layer 20 that exists outside of the bead. The first layer 10 has a half-bead 17 which, in perpendicular projection onto the layer plane of the layer 20, is located with its bead foot 18' within the bead top 29 of the bead 21 of the layer 20.

In the compressed state, the half-bead 17 and the layer 10 that is shortened towards the through-opening 2a now act as a deformation limiter for the half-bead 27a, while said half-bead 27a protects the half-beads 17 and 27' against media from the through-opening 22a.

FIG. 3B shows a detail C from FIG. 2B, namely a cross-section through the web region 26. In said region, the two half-beads 27a and 27b which respectively run around the through-opening 22a or 22b in the layer 20 thereof together form a full bead and thus seal the region between the two through-openings 2a and 2b of the gasket 1.

Figure 4:
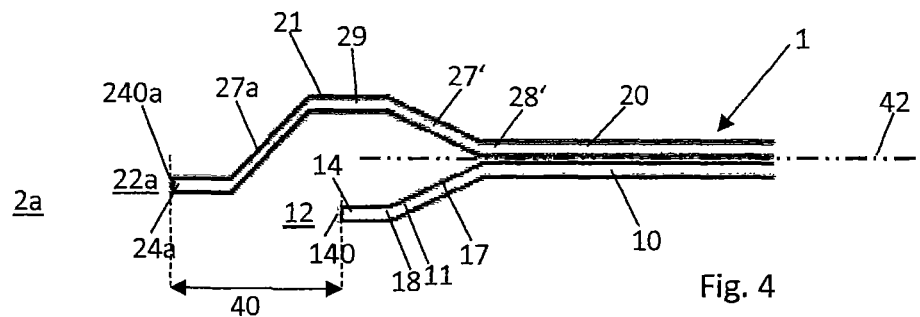
FIGS. 4 to 6 show flat gaskets according to the invention.
Figure 5:
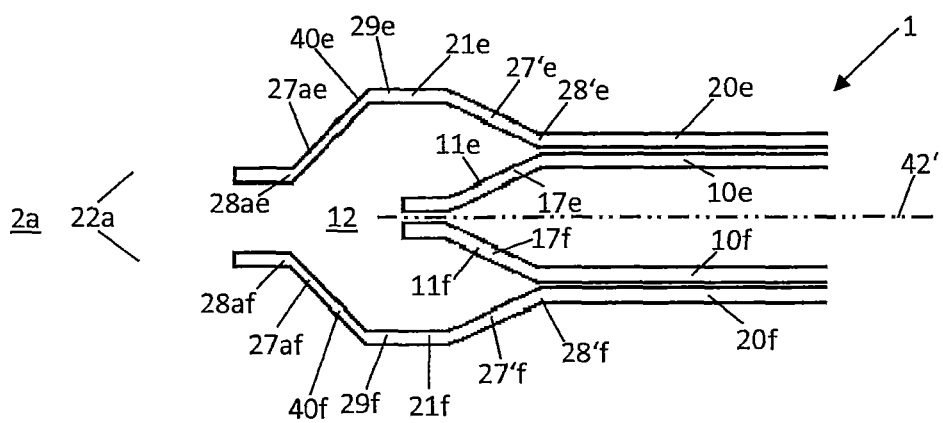
Figure 6:
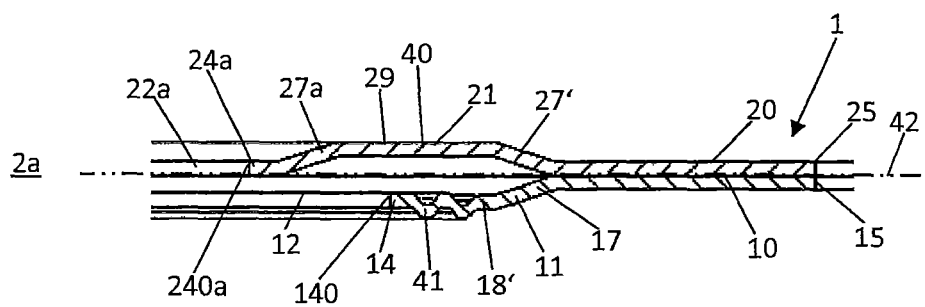

FIGS. 4, 5 and 6 show details from further flat gaskets according to the invention, which correspond to the detail B in FIG. 2C and to the detail shown in FIG. 3A.

In the flat gasket 1 shown in FIG. 4, the full bead 21 in the illustrated non-compressed state has a steeper flank 27a than the flank 27' (steeper half-bead 27a than the half-bead 27'). In addition, the half-bead 27a extends to below the layer plane of the layer 10, resulting in an increased pre-tensioning of the half-bead 27a in the compressed state of the gasket 1. The deeper embossing of the half-bead 27a than the half-bead 17 thus improves in particular the sealing in the cold state. Otherwise, the half-bead 17 and the half-bead 27' are mirror-symmetrical with regard to the centre plane 42 between the layers 10 and 20. In the exemplary embodiment of FIG. 4, the overhang 40 by which the layer edge 24 of the second layer 20 that encircles the through-openings 2a, 2b protrudes beyond the circumferential edge 140 that encircles the through-opening 12 is considerably more than two times the sheet thickness of one of the two layers 10, 20, namely approximately ten times said sheet thicknesses.

FIG. 5 shows a further flat gasket 1 according to the invention, in the same detail as in FIG. 4. This flat gasket now has a total of four layers 10e, 10f, 20e, 20f, that is to say an even number of layers. These layers are arranged in pairs, namely layer 10e with layer 20e and layer 10f with layer 20f. Each pair of layers is arranged as shown in FIG. 4. However, the two pairs of layers 10e/20e and 10f/20f are arranged mirror-symmetrically with regard to the centre axis 42' between the two layer pairs. The two half-beads 17e and 17f thus serve as deformation limiters for the half-beads 27ae and 27af, respectively.

FIG. 6 shows a further embodiment of a flat gasket 1 according to the invention. The detail shown likewise corresponds to the region shown in FIG. 4. However, in contrast to said embodiment, the bead foot 18' of the half-bead 17, that is to say the layer edge 14, is now provided with a profiling 41. As shown in FIG. 6, this profiling can be regarded as a corrugated profiling which runs along the circumferential edge 140, perpendicular thereto in cross-section. Such a corrugated profiling 41 gives the layer edge 14 increased rigidity and therefore serves as an additional deformation limiter for the half-beads 17, 27a and 27' during installation and compression of the flat gasket 1.

Figure 7A:
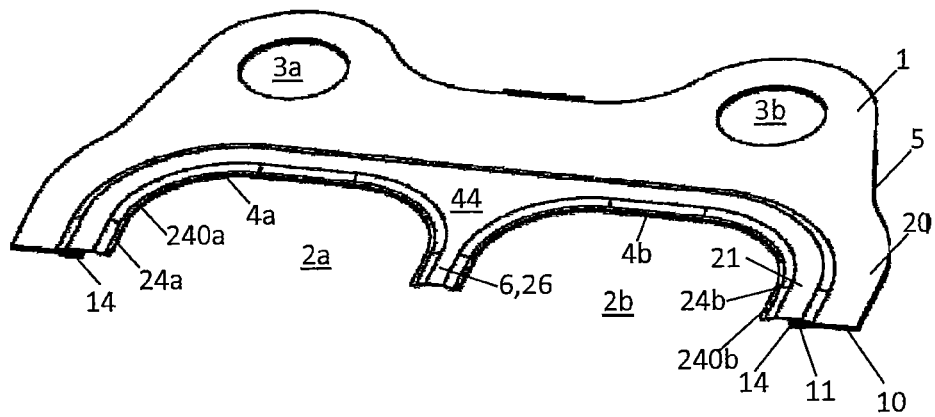
FIG. 7 shows, in two sub-FIGS. 7A-7B, a perspective cross-section and a plan view of a flat gasket according to the invention.
Figure 7B:
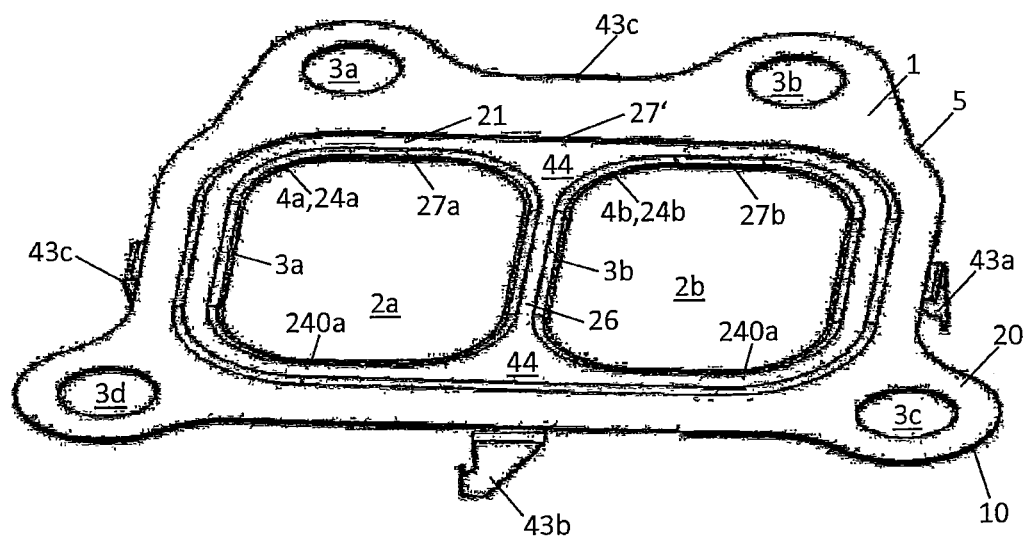

FIG. 7 shows, in two sub-FIGS. 7A and 7B, a cut-away perspective view through a variant of the flat gasket shown in FIG. 2 and a plan view of a corresponding flat gasket. Here, in addition to the previously described elements of the flat gasket, fastening elements 43 are arranged on the four sides of the flat gasket, by means of which fastening elements the flat gasket can be secured for example to a turbocharger. The further design of the flat gasket in FIG. 7 is the same as in FIG. 2.

The invention claimed is:
1. A flat gasket, comprising:
   a first and a second metal layer arranged adjacent to one another perpendicular to a layer plane of the second metal layer,
   wherein one or more through-openings arranged adjacent to one another in the layer plane extend through the flat gasket,
   wherein a layer edge of the first metal layer that encircles said through-openings is configured as a half-bead which runs along the layer edge and points away from the second layer,
   wherein a layer edge of the second metal layer that encircles said through-openings is configured as a full bead which runs along said layer edge and points away from the first layer, said full bead consisting of two half-beads, and
   wherein the layer edge of the second metal layer that encircles said through-openings protrudes at least in some regions with a flank of its half-bead adjacent to the through-opening beyond the adjacently running layer edge of the first metal layer.
2. The flat gasket according to claim 1, wherein, in a projection of the flat gasket perpendicular to the layer plane of the second metal layer, the layer edge of the first metal layer that encircles the through-openings is arranged in a bead top of the full bead of the second metal layer.

3. The flat gasket according to claim 1, wherein bead feet of the full bead of the second layer are in or parallel to the layer plane of the second metal layer.

4. The flat gasket according to claim 3, wherein a bead foot of the full bead of the second layer that is closest to a circumferential edge is arranged at least in some regions in a layer plane of the first layer or, as viewed from the second layer, behind the layer plane of the first layer.

5. The flat gasket according to claim 1, wherein at least two through-openings arranged adjacent to one another in the layer plane of the second layer extend through the flat gasket, said through-openings being separated from one another by a web region,
wherein, in the web region, the second layer forms a web which runs between the adjacently arranged through-openings, and the first layer does not extend into the web region between the adjacent through-openings.

6. The flat gasket according to claim 5, wherein at a distance from the web region, the half-bead of the first layer and the half-bead of the second layer that is remote from the respectively adjacent through-opening are mirror-symmetrical with regard to the layer plane of the second layer.

7. The flat gasket according to claim 6, wherein the half-bead portions of the second layer that are remote from the respectively adjacent through-opening and run adjacent to adjacent through-openings merge into one another in a transition region from a region at a distance from the web to the web region, such that they do not extend into the web region and the half-beads adjacent to the through-openings together form a full bead in the web region.

8. The flat gasket according to claim 1, wherein an overhang by which the layer edge of the second layer that encircles the through-openings protrudes beyond the layer edge of the first layer that encircles the through-openings is at least two times a sheet thickness of the second layer in the overhang.

9. The flat gasket according to claim 1, wherein a bead foot of the first layer pointing towards the through-opening has embossments, wherein the embossments are arranged or running along the circumferential edge of the through-openings, in the region which, in a projection into the plane of the second layer, comes to lie in the bead top of the full bead of the second layer.

10. The flat gasket according to claim 1, wherein sheet thicknesses of the first and second layer a non-beaded region differ by ≤0.1 mm.

11. The flat gasket according to claim 1, wherein the flat gasket has two first and two second layers, wherein the two first layers are arranged directly adjacent to one another.

12. The flat gasket according to claim 11, wherein the beads of the first layers that encircle the through-openings are mirror-symmetrical to one another and/or the beads of the second layers that encircle the through-openings are mirror-symmetrical to one another, wherein beads of the first layers and the bead of the second layers are mirror-symmetrical to one another with regard to a boundary between the two first layers.

13. The flat gasket according to claim 1, wherein the flat gasket is located in a hot gas region of an internal combustion engine, in an exhaust gas region of the internal combustion engine, in an exhaust gas purification, in a catalytic converter, in a region of a compressor, or in a turbocharger or a supercharger.

* * * * *